United States Patent [19]

Holder

[11] 4,436,526

[45] Mar. 13, 1984

[54] METHOD FOR MAKING AN ARTIFICIAL FUEL LOG

[75] Inventor: Morris E. Holder, East Ridge, Tenn.

[73] Assignee: HMVH Corporation, Chattanooga, Tenn.

[21] Appl. No.: 392,287

[22] Filed: Jun. 25, 1982

[51] Int. Cl.³ .............................................. C10L 5/00
[52] U.S. Cl. .................... 44/10 B; 44/1 E; 44/14; 44/25
[58] Field of Search ............... 44/10 B, 10 R, 13, 14, 44/10 H, 21, 25

[56] References Cited

U.S. PATENT DOCUMENTS

| | | | |
|---|---|---|---|
| 4,015,951 | 4/1977 | Gunnerman | 44/10 E |
| 4,120,666 | 10/1978 | Lange | 44/13 X |
| 4,236,897 | 12/1980 | Johnson | 44/25 X |

FOREIGN PATENT DOCUMENTS 244623  12/1925  United Kingdom ................... 44/14

Primary Examiner—Carl F. Dees
Attorney, Agent, or Firm—David J. Hill

[57] ABSTRACT

An improved method is disclosed for making an artificial fuel log from a mixture of combustible material and binder. According to this method, the mixture is placed in a hollow mold which is open at both ends, and compressive forces, having both axial and radial components, are applied at both ends of the mold to compress the mixture in the mold. Both ends of the mold are closed to maintain the compressed mixture therein at a fixed volume while the mixture is at least partially cured therein. The closures are then removed from the ends of the mold, and the fuel log is removed from the mold.

14 Claims, 6 Drawing Figures

METHOD FOR MAKING AN ARTIFICIAL FUEL LOG

BACKGROUND OF THE INVENTION

The present invention relates to the production of artificial fuel logs from a mixture of combustible material and binder. More particularly, this invention relates to the production of such logs by a method which includes compressing the mixture in a mold.

Artificial fuel logs, such as are suitable for burning in fireplaces, are well known. Such logs are made from a variety of combustible materials, although sawdust is the material most often used. Binders used include both thermoplastic and thermosetting types, with thermoplastic petroleum distillates such as wax being quite popular. Artificial fuel logs are made by both extrusion and compression methods.

An extrusion method for making artificial fuel logs is described in U.S. Pat. No. 4,042,343 of Bernard. According to this method, a mixture of sawdust and hot wax is conveyed to a cooler, where much of the heat from the wax is removed. The cooled mixture is then transported through a surge hopper to an extruder. The mixture is extruded through a die so as to assume a generally cylindrical, elongated log shape, and the log shape is cut into individual logs of the desired length.

Because extrusion methods for making artificial fuel logs are quite energy-intensive, the amount of energy produced by burning a log made by such a method may not be substantially greater than the amount of energy required to make the log. Another disadvantage of extrusion methods is the requirement that the combustible material used in the mixture of combustible material and binder be of uniformly small particle size to accommodate extrusion of the mixture through a die. It is to satisfy this requirement that fine sawdust is the material most often used in making logs by extrusion methods. Compression methods, however, offer the advantage of flexibility in the particle size and in the uniformity of particle size of the combustible materials used.

A compression method for making artificial fuel logs is described in U.S. Pat. No. 3,192,561 of Archer et al. According to this method a quantity of tree bark chips is coated with paraffin wax and the wax-coated chips are placed in the bottom section of a split mold die of circular cross-section. The upper section of the die is then lowered from above onto the bottom section to compress the mixture of chips and paraffin radially into a cylindrical log shape. A cylindrical mold, which is shorter in length than the split mold but of comparable internal diameter, is then positioned in coaxial alignment with the split mold, and a ram is used to push the log shape out of the split mold and into the shorter mold. A second ram then cooperates with the first ram to compress the log shape in the shorter mold axially from both ends. The finished log is then ejected from the shorter mold.

Although they have been quite popular, artificial fuel logs made with binders of wax or other petroleum distillates have several undesirable features. Such logs typically derive the major portion of their fuel value from the binder. Consequently, they burn at higher temperatures and they produce less heat per unit of weight than do natural logs. Furthermore, when heated, such logs evolve hydrocarbon vapors which support combustion and which, if confined, may be explosive. It is for this reason that burning of such logs in airtight woodburning stoves is not advised.

Artificial fuel logs made with binders of wax or other petroleum distillates also exhibit low hot strength. Because of the relatively low melting point of the petroleum distillates used in such logs, they become pliable under relatively warm ambient conditions. Furthermore, they tend to lose cohesion very rapidly, and they often collapse almost immediately after being warmed throughout. For this reason, this type of log cannot be burned on andirons but must be burned on a grate.

Because of the disadvantages inherent in a use of thermoplastic binders, artificial fuel logs have also been made using non-thermoplastic binders These logs are usually made by a compression method. For example, U.S. Pat. No. 3,986,845 of Hotchkiss describes a method for making such logs from chips of wood or cardboard, using as a binder a water-soluble glue. According to this method, chips of wood or shredded cardboard are charged into the upper end of an inclined, rotating drum. A water-soluble glue is sprayed on the chips as they enter the drum. The tumbling of the chips in the drum coats the chips with glue, and the propelling impetus of the glue spray helps to move the chips downwardly and out of the lower end of the drum. The coated chips emerge from the drum into a compacting chamber having a generally cylindrical cross-section, and periodically, a hydraulic ram is caused to move axially in the cylindrical chamber to compress the chips therein into a log shape. Finally, the ram is used to eject the finished log from the compacting chamber.

It is also known that artificial fuel logs may be made by a compression method using a thermosetting binder such as a urea formaldehyde resin. In my U.S. Pat. No. 4,220,453, I describe and claim a compression method for making artificial fuel logs in which such a binder is preferably used. According to this method, a mixture of combustible material and binder is prepared, and a quantity of the mixture sufficient to fill a tubular, open-ended mold is divided into two portions. One portion is then introduced through each of the open ends of the mold, and axial compressive forces are applied to the mixture in the mold from each end, so as to compress the mixture within the mold. The ends of the mold are then closed to maintain the mixture therein at a fixed volume, and the mixture is at least partially cured in the mold. The closures are then removed from the ends of the mold, and the finished log is removed from the mold.

The artificial fuel log made by the method of my U.S. Pat. No. 4,220,453, using a thermosetting binder, may be burned safely in a fireplace or in an airtight, woodburning stove. The amount of energy produced by burning such a log is substantially greater than the amount of energy required to make the log. In addition, the energy produced by burning such a log is derived almost entirely from the burning of the combustible material in the mixture from which the log is made. This log exhibits high hot strength, and when the combustible material used is a wood product, its combustion characteristics are quite similar to those of a natural log of comparable size. Furthermore, this log can be made using combustible materials of various types and of various particle sizes. However, it has been found that this log may vary somewhat in density along its length. Depending on the extent of the density variation, the log may not burn uniformly. Therefore, it would be advantageous if a log could be produced having all of the advantageous features of logs produced by my prior method, but also having a relatively uniform density along its length.

It has also been observed that some consumers prefer an artificial fuel log that is easier to ignite than a natural log of comparable size. Therefore, it would also be advantageous if a log could be produced which has all of the advantageous features of logs produced by my prior method, but which also may be ignited more easily than a natural log of comparable size.

SUMMARY OF THE INVENTION

In spite of the great popularity of woodburning stoves and fireplaces for use as supplemental (or even primary) heating units, there is increasing resistance today to the cutting of trees for burning. In addition, as timber resources are depleted, the supply of natural firewood will diminish, even as the demand for firewood increases. Consequently, there is a great need for the development of a method for producing an artificial fuel log that can be substituted for natural wood in stoves and fireplaces.

It is, therefore, an object of this invention to provide a method for making an artificial fuel log that has combustion characteristics which are quite similar, if not superior, to those of natural logs of comparable size. It is another object of this invention to provide a method for making an artificial fuel log which has a relatively uniform density along its length. It is yet another object of this invention to provide a method for making an artificial fuel log which may be ignited more easily than a natural log of comparable size.

In accordance with these and other objects, method is disclosed for making artificial fuel logs from a mixture of combustible material and binder. According to this method, the mixture is placed in a hollow mold which is open at both ends, and compressive forces, having both axial and radial components, are applied at both ends of the mold to compress the mixture in the mold. In a preferred embodiment of the invention, the compressive forces are applied by inserting plungers having tapered mandrels thereon into both open ends of the mold and moving the plungers toward each other in the mold so as to compress the mixture therein. Both ends of the mold are closed to maintain the compressed mixture therein at a fixed volume while the mixture is at least partially cured therein. The closures are then removed from the ends of the mold, and the fuel log is removed from the mold.

In order to facilitate an understanding of the invention, an apparatus in which the method may be practiced is illustrated in the drawings, and a detailed description of the preferred embodiments of the method follows. It is not intended, however, that the invention be limited to the particular embodiments described or to use in connection with the apparatus shown. Various changes are contemplated such as would ordinarily occur to one skilled in the art to which the invention relates.

DESCRIPTION OF THE PREFERRED EMBODIMENTS OF THE INVENTION

Figure 1:
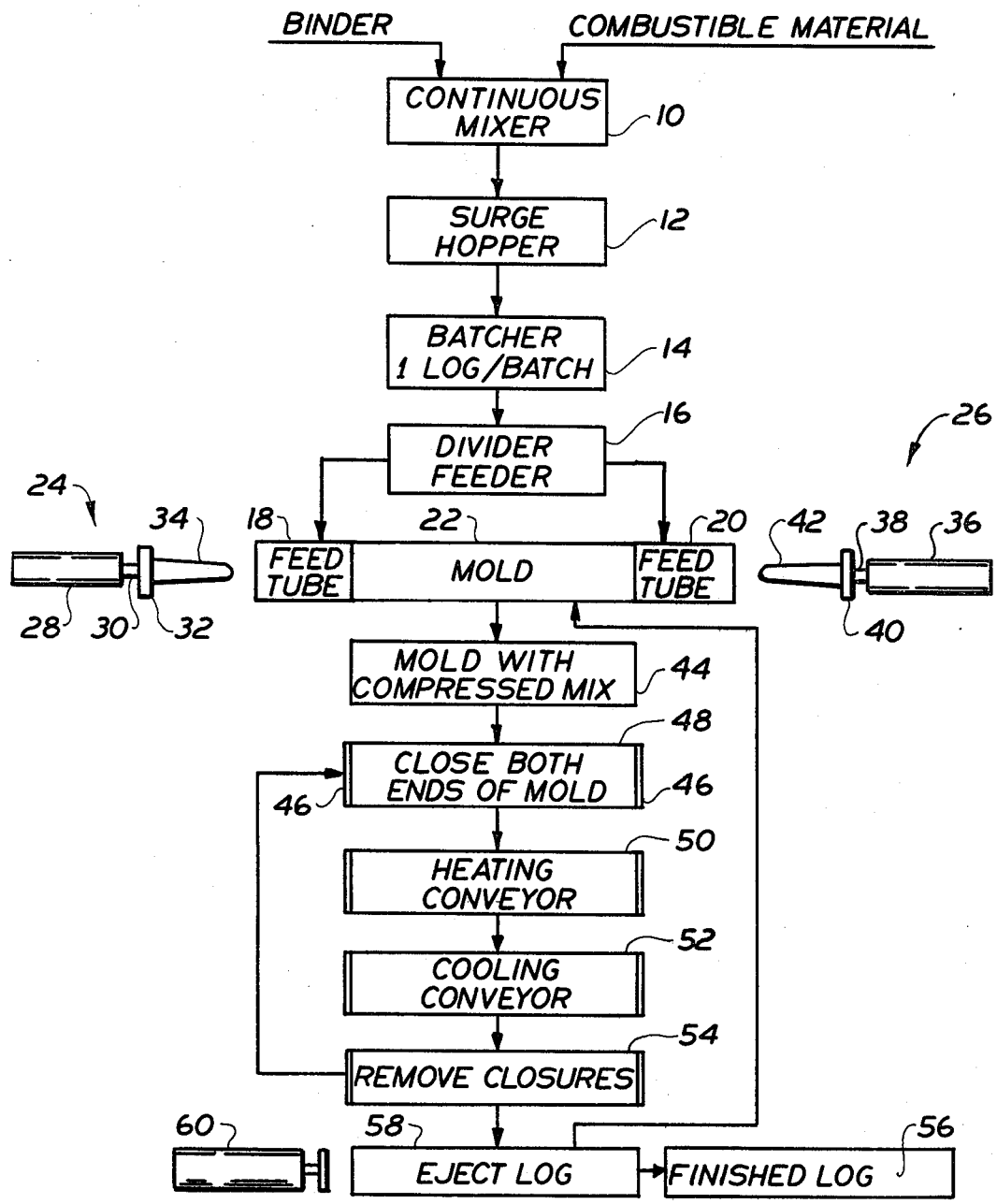
FIG. 1 is a schematic illustration of a flow chart showing the steps of a preferred embodiment of the invention and a portion of an apparatus that may be used in the practice of the preferred method.

In FIG. 1, a flow chart showing the steps of a preferred embodiment of the method of the invention is illustrated. The initial step of this embodiment is the preparation of a mixture of combustible material and binder. The particular combustible material used is not critical, although lignocellulosic materials are preferred. Such materials include chips and shavings of various types of wood, sawdust, wood bark, twigs and waste materials obtained by processing of trees and lumber. Cellulosic materials, such as bagasse, plant stalks, straw, peanut hulls and peat moss, may also be used in the method with good results. Mineral materials, such as lignite and coal, may also be used.

It is preferred that the moisture content of the combustible material used not exceed 18% by weight. If the material contains a higher moisture content, it may be advisable to dry it somewhat before preparing the mixture.

Combustible materials of various particle sizes may be used in the method of the present invention. Wood chips up to several inches in length may be used successfully in mixture with wood shavings having particle sizes within the range of 0.0625–0.25 inch and with finely divided sawdust.

Different types of materials may also be used successfully in the mixture to achieve desired results. For example, the heat value of a log produced by this method, using as the combustible material a mixture of wood chips and coal particles, typically would be greater than that of a log produced by this method using only wood chips as the combustible material.

The type of binder used in the method of this invention is also not critical, although thermosetting, resinous binders are preferred. Among thermosetting resinous binders, the most preferred are melamine formaldehyde resins and urea formaldehyde resins. Good results have been obtained, in the practice of the present invention, by a use as binder of a melamine formaldehyde resin sold by American Cyanimid Company under the name "M3" resin.

It is not necessary that a large amount of binder material be used in the practice of the invention, especially where the binder used is a thermosetting resin. The amount of binder required depends on the nature of the particular binder selected and on the moisture content and particle size of the combustible material used, as is known to those skilled in the art. In formulating mixtures using melamine formaldehyde or urea formaldehyde resins, good results have been obtained when the mixture contained 3–12% by weight binder and 88–97% by weight combustible material.

According to the method of the present invention, a mixture of combustible material and binder is prepared. Such a mixture may be prepared, as illustrated in FIG. 1, in a mixer such as continuous mixer 10.

According to the method of this invention, the mixture of combustible material and binder is provided in a hollow mold which is open at both ends. A preferred manner for accomplishing this is illustrated in FIG. 1. As shown therein, the mixture obtained from mixer 10 is supplied to surge hopper 12 for temporary storage. A batch of the mixture sufficient to make one artificial fuel log is then received from the surge hopper by batcher 14. The volume of material in a batch depends on the desired size and density of the fuel log to be produced, and the weight of a batch depends on the volume of the batch and on the type and moisture content of the combustible material in the mixture, as well as on the type and relative amount of binder in the mixture.

According to the embodiment of the invention which is illustrated in FIG. 1, each batch of the mixture is divided into two portions, which are approximately equal in volume, in divider-feeder 16. One of the two portions is then conveyed to feed tube 18 and the other is conveyed to feed tube 20. A suitable material conveying apparatus may be employed to transfer the batch portions into the respective feed tubes. By splitting each batch of mix into two approximately equal portions and then loading those portions into the mold from both ends, the length of mold 22 along which each portion passes is cut in half, with the results that the time to load the mold is reduced and the amount of sliding friction encountered by the batch portion while moving inwardly along the sidewall of the mold is half the amount that would be encountered if the entire batch were loaded into the mold from one end.

Referring again to FIG. 1, mold 22 is adapted to be aligned with and located between feed tubes 18 and 20. Preferably, mold 22 is one of a number of such molds that is removably positionable between the two feed tubes. Each mold of this embodiment of the invention is a hollow, substantially cylindrical tube, although the mold may be of square or other convenient cross-sectional shape. Each mold must be open at both ends, and it preferably should have a smooth internal surface to reduce friction. The internal dimensions of the mold determine the size of the finished artificial fuel log, as previously mentioned, which by way of example may be four inches in diameter by eighteen inches long.

After a mixture of combustible material and binder is provided in a mold, compressive forces, having both axial and radial components, are applied at both ends of the mold to compress the mixture in the mold. The mold must be made of a material having sufficient strength to withstand these compressive forces, and molds made of stainless steel tubing having a wall thickness of 0.125 inch have been used effectively in actual practice of the method of the invention.

Referring again to the embodiment of the invention illustrated in FIG. 1, mold 22 is disposed between feed tubes 18 and 20, each of which contains one batch portion of the mixture. Log compressors 24 and 26 may be employed to move each batch portion into the mold, and to apply the required compressive forces to the mixture in the mold. Compressor 24 includes hydraulic cylinder 28, piston rod 30, plunger 32 and tapered mandrel 34. Similarly, compressor 26 includes hydraulic cylinder 36, piston rod 38, plunger 40 and tapered mandrel 42. The tapered mandrels are generally of conical shape, although they may be of pyramidal or other convenient shape. They may be attached to the plungers by threaded connection or by any other suitable means known to those skilled in the art.

Figure 2:
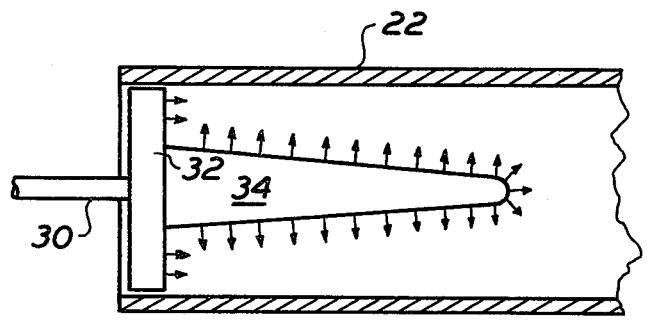
FIG. 2 is a schematic sectional view showing a portion of the apparatus illustrated in FIG. 1 as a preferred means for applying compressive forces to the mixture in the mold according to the invention.

Compressors 24 and 26 may be caused, in a manner known to those skilled in the art, to insert plungers 32 and 40, having tapered mandrels 34 and 42 respectively mounted thereon, into the open ends of mold 22 and to move the plungers toward each other in the mold so as to compress the mixture therein. As compressors 24 and 26 are operated to move their respective plungers and mandrels toward each other in the mold, compressive forces which are directed perpendicular to the surfaces of mandrels 34 and 42 and of plungers 32 and 40 are applied to the mixture in the mold. FIG. 2 illustrates this application of forces by compressor 24. As shown therein, plunger 32 with tapered mandrel 34 attached thereto is inserted into mold 22, which contains a batch of the mixture (not shown). As piston rod 30 causes plunger 32 to move into the mold (from left to right in FIG. 2), compressive forces (illustrated by the arrows), which are directed perpendicular to the surfaces of plunger 32 and mandrel 34, are applied to the mixture. The forces which are applied by plunger 32 are directed in the axial direction, and the forces which are applied by mandrel 34 contain both axial and radial components. Although not shown in FIG. 2, operation of compressor 26 would cause similar compressive forces to be applied to the mixture in the mold at the other end. Preferably, the compressive forces are applied to the mixture simultaneously and substantially equally at both ends of the mold, so as to provide a relatively uniform density of the compressed mixture within the mold. The pressure required to compress the mixture varies with the type and moisture content of the combustible material in the mixture and with the density desired for the finished fuel log. For a log made using lignocellulosic materials having a desired density comparable to that of a natural log, a typical operating pressure would be within the range of 1400–2000 psi, preferably around 1600 psi.

By compressing the mixture from both ends of the mold, a more uniform density of the mixture within the mold is obtained than would be obtained by compression only from one end. Furthermore it has been found that loading each of the two separate portions of the mixture into opposite ends of the mold followed by application of compressive forces at both ends of the mold creates a fracture line in the center of the resulting log, which greatly facilitates breaking the log in half when it is desired to burn only half a log.

FIGS. 3–6 illustrate several plunger and mandrel configurations by which compressive forces having both axial and radial components may be applied at both ends of the mold to compress the mixture in the mold; however, for the sake of clarity, the mixture in the mold is not shown in FIGS. 3–6. Each of the configurations illustrated may be used according to the invention by inserting plungers such as are shown having tapered mandrels such as are shown thereon into both open ends of the mold and moving the plungers toward each other in the mold so as to compress the mixture therein. The taper and size of the mandrels illustrated in FIGS. 3–6 are exaggerated somewhat, for purposes of illustration, and are greater than that which would be necessary to apply the compressive forces according to the invention. Mandrels having a taper within the range of 2°–15° and having a base diameter (at the point of attachment to the plunger) within the range of 0.5–2.0 inches have been found to give preferred results.

FIGS. 3–6 also illustrate preferred embodiments of the method of the invention, according to which the mandrels on the plungers meet within the mold during application of the compressive forces to the mixture, so that a substantially continuous passageway is formed which extends through the log. The presence of such a passageway through the artificial fuel log of this invention provides an increased surface area which is available for heating to ignition temperature and thereby makes the log of this embodiment easier to ignite than a natural log of comparable size. The presence of such a passageway also provides a "chimney effect" to assist the combustion of the log, whereby the heating of a portion of the log adjacent to the passageway will cause air to be drawn through the passageway.

Figure 3:
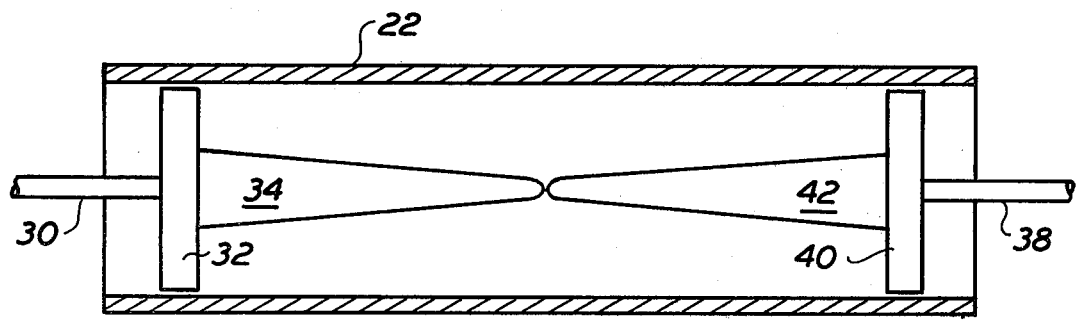
FIG. 3 is a schematic sectional view showing a portion of the apparatus illustrated in FIG. 1 as a preferred means for applying compressive forces to the mixture in the mold according to the invention by use of plungers having tapered mandrels thereon.

Referring now to FIG. 3, piston rods 30 and 38 may be employed to move plungers 32 and 40 having tapered mandrels 34 and 42 respectively thereon toward each other in mold 22 so that the mandrels meet therein, as shown. After the compressive forces have been applied to the extent shown, so that the mandrels have met within the mold, the plungers may be withdrawn from the mold, leaving a compressed mixture therein having a substantially continuous passageway therethrough.

Figure 4:
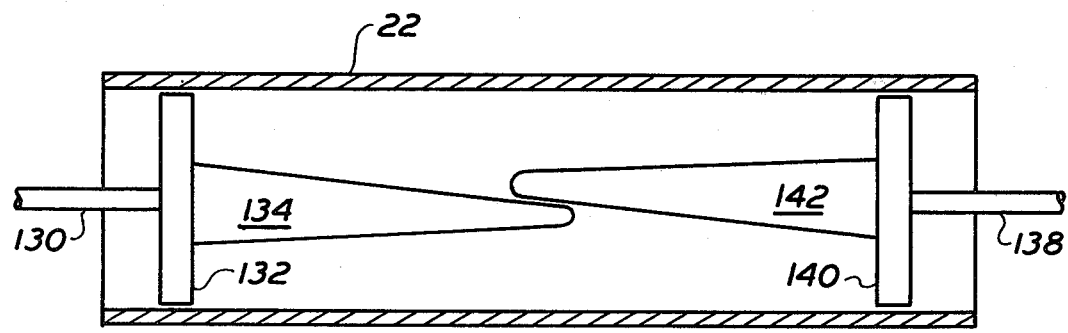
FIG. 4 is a schematic sectional view showing an alternative to the plunger and mandrel configuration of FIG. 3.

FIG. 4 shows an alternative to the plunger and mandrel configuration of FIG. 3. As shown in FIG. 4, piston rods 130 and 138 may be employed to move plungers 132 and 140 having tapered mandrels 134 and 142 respectively thereon toward each other in mold 22 so that the mandrels meet therein. However, unlike the plunger and mandrel arrangement of FIG. 3, mandrels 134 and 142 are so arranged that they meet within mold 22 in a bypass configuration.

Figure 5:
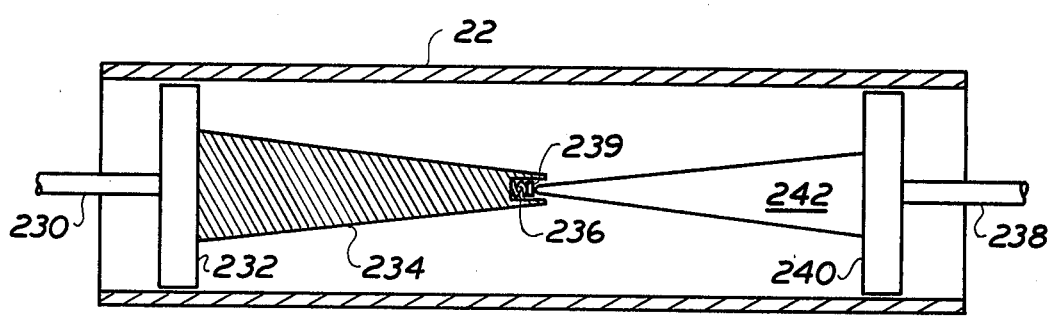
FIG. 5 is schematic sectional view showing a second alternative to the plunger and mandrel configuration of FIG. 3.
Figure 6:
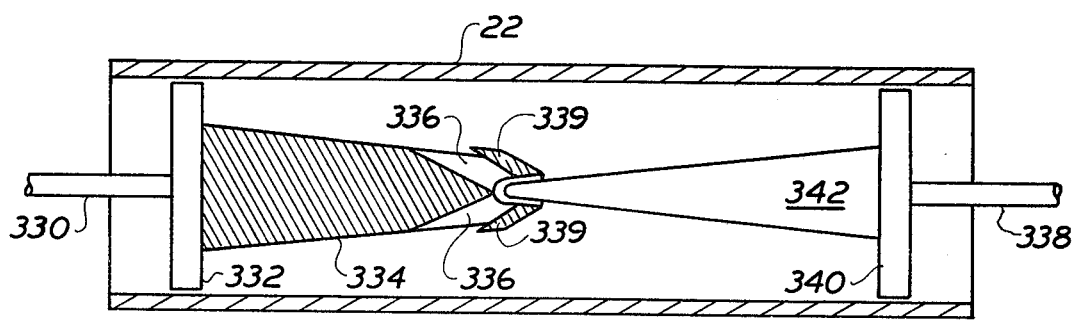
FIG. 6 is a schematic sectional view showing a third alternative to the plunger and mandrel configuration of FIG. 3.

Both FIGS. 5 and 6 illustrate alternatives to the plunger and mandrel configuration of FIG. 3 which have male and female members. The female mandrels are shown therein in cross-section for clarity. As shown in FIG. 5, piston rods 230 and 238 may be employed to move plungers 232 and 240 having tapered mandrels 234 and 242 respectively thereon toward each other in mold 22 so that the mandrels meet therein in a male-female configuration. Female mandrel 234 has a cavity in its forward end in which is located spring 236 and plug pusher 239. As male mandrel 242 meets female mandrel 234, it tends to push a small portion of the mixture into the cavity in the forward end of mandrel 234 and compress it into a small plug. However, after the mandrels are withdrawn from the meeting relationship, plug pusher 239, urged by spring 236, will push the plug out of the cavity so that the cavity will not be blocked or clogged when the mandrels are used to compres the mixture in subsequent log molding operations. The sizes of the cavity, plug pusher and spring are not critical, although the spring should be quite strong. They depend on the size of the mandrels and should be selected for convenience and ease of operation.

As shown in FIG. 6, piston rods 330 and 338 may be employed to move plungers 332 and 340 having tapered mandrels 334 and 342 respectively thereon toward each other in mold 22 so that the mandrels meet therein in a male-female configuration. Female mandrel 334 has a cavity in its forward end into which male mandrel 342 tends to push a small portion of the mixture as the mandrels meet. However, mandrel 334 is provided with a plurality of vents 336 (two of which are shown) in communication with the cavity. As the mixture is pushed into the cavity by male mandrel 342, it may pass out of the cavity through vents 336 without blocking or clogging the cavity. In order for this to be accomplished easily, the vents are provided with an exit opening from the mandrel that is larger than the entrance opening at the end of the cavity. As mandrel 334 moves to meet mandrel 342 within the mold, flared portions 339 clear the way for the vents so that the mixture entering the cavity may exit through the vents.

The size of the cavity and the size and number of vents in the female mandrel depend on the size of the mandrels used. The angle of orientation of the vents is not critical, provided that the vents direct the mixture passing therethrough generally toward the plunger. In producing a log having a diameter of four inches and a length of eighteen inches using wood shavings as the combustible material in the mixture, preferred results ma be obtained by using a male mandrel with a base diameter of 1.5 inches, a length of 9 inches and a taper of 5° and a female mandrel with a base diameter of 1.5 inches, a length of 9 inches, a taper of 5°, a cavity diameter of 0.5625 inch, a cavity depth of 0.75 inch, and having 4 vents spaced at equal intervals around the periphery of the mandrel and oriented at an angle of 60°, with vent entrance openings having a diameter of 0.1875 inch and vent exit openings having a diameter of 0.25 inch.

Referring again to FIG. 1, after compressive forces have been applied to the mixture in mold 22, compressors 24 and 26 are operated to remove their plungers and mandrels from the mold. The mold with the compressed mixture therein must then be closed at both ends to maintain the compressed mixture therein at a fixed volume. As shown in FIG. 1, mold 44, containing the compressed mixture, is closed by application of closures 46, before the compressed mixture rebounds out of the mold. The closures must be sufficiently secure to withstand internal pressures generated within the mold by expansion of the compressed mixture and during the subsequent curing step. Closures may be made of any suitable material, such as steel plate, and equipped with any appropriate fastening devices for engaging the ends of the mold. By closing the mold to maintain the compressed mixture therein at a fixed volume, the mixture is effectively held under compression during the subsequent curing step.

After the ends of the mold are closed, at least partial curing of the mixture within the mold must be effected. The method of curing used will depend on the type of binder contained in the mixture. If a thermosetting binder is used, as is preferred, curing may be effected by heating the mold with the compressed mixture therein.

Referring again to the embodiment of the method of the invention which is illustrated in FIG. 1, closed mold 48 is heated to an elevated temperature corresponding to the catalyzing temperature of the particular thermosetting resin binder used in the mixture. Preferably, this heating is carried out by placing the mold on a conveyor such as conveyor 50 which transports the mold through an appropriate heating oven. The conveyor may be arranged to transport a number of closed molds through the oven at the same time. The preferred time during which the mold is heated in the oven and the preferred temperature at which it is heated depend on the type and moisture content of the combustible material contained in the mixture and on the nature of the thermosetting binder used. Preferred results may be obtained, when making a log using a mixture of lignocellulosic material having a moisture content of 18% by weight or less and a thermosetting resinous binder, when the compressed mixture within the mold is heated to a temperature within the range of 240°–300° F. for a period within the range of 5–15 minutes to effect at least partial curing thereof.

After the compressed mixture in the mold is heated to effect at least partial curing, it may be cooled to room temperature by transport on cooling conveyor 52. In practice, conveyor 52 may be an extension of conveyor 50 which transports the mold or, desirably, a number of molds, outside of and beyond the oven for a suitable and convenient time so that the mold may be allowed to cool by contact with ambient air. Additional curing of the compressed mixture within the mold may take place during transport of the mold on the cooling conveyor. Preferably, the compressed mixture within a mold should be allowed to cool for at least 40 minutes after the mold emerges from the oven.

After the mold and its contents have been cooled for a sufficient time, closures 46 are removed from the mold, as indicated at 54, and returned to the mold closing station for reuse. The finished log 56 can now be removed from the mold at ejection station 58, and the empty mold can be returned to the mold loading station for reuse.

Due to surface friction between the log and the mold, a substantial amount of force may be required to eject the log from the mold, and a hydraulic ram such as ram 60 may be provided for that purpose. In order to minimize the ejecting force required, and also to facilitate loading of the mixture into the mold as previously described, it is desirable to coat the inside of the mold with a suitable friction-reducing material. This material must be sufficiently durable to withstand the temperatures and pressures used in the method, and suitable materials are known to those skilled in the art.

After removal from the mold, the finished log is ready to be appropriately packaged and shipped to the consumer. This log can be made using combustible materials of various types and of various particle sizes. When made using lignocellulosic materials, this log exhibits combustion characteristics which are quite similar to those of a natural log of comparable size. Furthermore, the log of this invention has a relatively uniform density along its length, and when made according to a preferred embodiment of the method of the invention, it may be ignited more easily than a natural log of comparable size.

The invention, as described herein, is susceptible to various modifications and adaptations, and the same are intended to be comprehended within the meaning and range of equivalents of the appended claims.

What is claimed is:

1. A method for making an artificial fuel log comprising:
    (a) providing a mixture of combustible material and binder in a hollow mold which is open at both ends;
    (b) applying compressive forces having both axial and radial components at both ends of the mold to compress the mixture in the mold;
    (c) closing both ends of the mold to maintain the compressed mixture therein at a fixed volume;
    (d) effecting at least partial curing of the compressed mixture within the mold;
    (e) removing the closures from the ends of the mold; and
    (f) removing the fuel log from the mold.

2. The method of claim 1 wherein the compressive forces are applied simultanteously and substantially equally at both ends of the mold, so as to provide a relatively uniform density of the compressed mixture within the mold.

3. The method of claim 1 wherein the mixture is divided into two portions of approximately equal volume, and each of the portions is separately introduced into the respective open ends of the mold.

4. The method of claim 1 wherein the combustible material is lignocellulosic material having a moisture content of 18% by weight or less, and the binder is a thermosetting resin.

5. The method of claim 4 wherein the compressed mixture within the mold is heated to a temperature within the range of 240°–300° F. for a period within the range of 5–15 minutes to effect at least partial curing thereof.

6. The method of claim 4 wherein the binder is selected from the group consisting of melamine formaldehyde resins and urea formaldehyde resins.

7. The method of claim 6 wherein the mixture contains approximately 88–97% by weight combustible material and approximately 3–12% by weight binder.

8. The method of claim 1 wherein the compressive forces are applied by inserting plungers having tapered mandrels thereon into both open ends of the mold and moving the plungers toward each other in the mold so as to compress the mixture therein.

9. The method of claim 8 wherein the mandrels on the plungers meet within the mold during application of the compressive forces to the mixture, so that a substantially continuous passageway is formed which extends through the fuel log.

10. A method for making an artificial fuel log comprising:
    (a) providing a mixture of combustible material and binder in a hollow, tubular mold which is open at both ends;
    (b) inserting plungers having tapered mandrels thereon into both open ends of the mold;
    (c) moving the plungers toward each other in the mold so as to compress the mixture within the mold to produce a product of relatively uniform density;
    (d) removing the plungers from the mold;
    (e) closing both ends of the mold to maintain the compressed mixture therein at a fixed volume;
    (f) effecting at least partial curing of the compressed mixture within the mold;
    (g) removing the closures from the ends of the mold; and
    (h) removing the fuel log from the mold.

11. The method of claim 10 wherein the mandrels on the plungers meet within the mold so that a substantially continuous passageway is formed which extends through the fuel log.

12. An artificial fuel log made by the method comprising:
    (a) providing a mixture of combustible material and binder in a hollow mold which is open at both ends;
    (b) applying compressive forces having both axial and radial components at both ends of the mold to compress the mixture in the mold;
    (c) closing both ends of the mold to maintain the compressed mixture therein at a fixed volume;
    (d) effecting at least partial curing of the compressed mixture within the mold;

(e) removing the closures from the ends of the mold; and (f) removing the fuel log from the mold.

13. The artificial fuel log of claim 12 wherein the method further comprises applying the compressive forces by inserting plungers having tapered mandrels thereon into both open ends of the mold and moving the plungers toward each other in the mold so as to compress the mixture therein.

14. The artificial fuel log of claim 13 wherein the method further comprises moving the plungers so that the mandrels meet within the mold during application of the compressive forces to the mixture, whereby a substantially continuous passageway is formed which extends through the fuel log.

* * * * *